United States Patent
Nishimura et al.

(10) Patent No.: US 10,167,958 B2
(45) Date of Patent: Jan. 1, 2019

(54) VACUUM PRESSURE CONTROL APPARATUS

(71) Applicant: CKD CORPORATION, Komaki-shi, Aichi (JP)

(72) Inventors: Yasunori Nishimura, Kasugai (JP); Masayuki Watanabe, Kasugai (JP); Seiji Hashiguchi, Ichinomiya (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 15/414,091

(22) Filed: Jan. 24, 2017

(65) Prior Publication Data

US 2017/0234437 A1 Aug. 17, 2017

(30) Foreign Application Priority Data

Feb. 11, 2016 (JP) .................................. 2016-024229
Dec. 13, 2016 (JP) .................................. 2016-241462

(51) Int. Cl.
*F16K 1/226* (2006.01)

(52) U.S. Cl.
CPC .......... *F16K 1/2265* (2013.01); *F16K 1/2266* (2013.01)

(58) Field of Classification Search
CPC ....... F16K 1/2265; F16K 1/222; F16K 1/2266
USPC .................. 251/306, 305, 308, 314, 316; 137/527–527.4
See application file for complete search history.

(56) References Cited

U.S. PATENT DOCUMENTS

| | | | | |
|---|---|---|---|---|
| 4,289,296 A | * | 9/1981 | Krause | F16K 1/2285 251/173 |
| 4,372,530 A | * | 2/1983 | Livorsi | F16K 1/2263 251/173 |
| 6,367,771 B1 | * | 4/2002 | Mazot | F16K 1/24 251/188 |
| 6,508,268 B1 | | 1/2003 | Kouketsu | |
| 2015/0292627 A1 | | 10/2015 | Yamada | |

FOREIGN PATENT DOCUMENTS

JP 2000-148254 A 5/2000
JP 2014-109348 A 6/2014

* cited by examiner

*Primary Examiner* — Kevin Murphy
*Assistant Examiner* — Kelsey Cary
(74) *Attorney, Agent, or Firm* — Oliff PLC

(57) ABSTRACT

A vacuum pressure control apparatus includes an annular elastic seal member formed with a valve seat, and a doubly eccentric butterfly valve element configured to come into contact or separate from the valve seat. The vacuum pressure control apparatus is to be placed on a pipe connecting a vacuum chamber and a vacuum pump. The vacuum pressure control apparatus is configured to rotate the butterfly valve element in a first direction from a first valve closed position corresponding to an initial state to change vacuum pressure in the vacuum chamber. The vacuum pressure control apparatus further includes a control unit configured to rotate the butterfly valve element in a direction opposite to a first direction so that the butterfly valve element is moved to a second valve closed position different from the first valve closed position.

13 Claims, 15 Drawing Sheets

VACUUM PRESSURE CONTROL APPARATUS

CROSS-REFERENCE TO RELATED APPLICATIONS

This application is based upon and claims the benefit of priority from the prior Japanese Patent Applications No. 2016-024229 filed on Feb. 11, 2016 and No. 2016-241462 filed on Dec. 13, 2016, the entire contents of which are incorporated herein by reference.

BACKGROUND

Technical Field

The present invention relates to a vacuum pressure control apparatus including an annular elastic seal member formed with a valve seat, and a doubly eccentric butterfly valve element which comes into contact with or separates from the valve seat, the butterfly valve element being placed on a pipe connecting a vacuum chamber and a vacuum pump and being rotatable in a first direction to change vacuum pressure in the vacuum chamber.

Related Art

A vacuum pressure control apparatus used conventionally is disclosed, for example, in Patent Document 1, an application of which was filed by the present applicant. A poppet valve of this vacuum pressure control apparatus is adequate to control vacuum pressure. However, this poppet valve has a small conductance and thus could not be made compact.

Therefore, it is conceivable to use a doubly eccentric butterfly valve element in order to improve the conductance and to control the pressure of the vacuum chamber under near atmospheric pressure. For control of pressure under vacuum, it is necessary to delicately adjust an opening (an opening degree) of the valve element near a valve fully closed position, that is, just before the valve is completely closed. This adjustment is more difficult as differential pressure between an upstream side and a downstream side of the valve is larger.

The reason to use the doubly eccentric butterfly valve element is that, just before the valve is closed, the opening of the valve can be changed slowly with respect to a rotation angle of a valve element, thereby facilitating pressure control by the valve near a valve closed position.

RELATED ART DOCUMENTS

Patent Document 1: Japanese patent application publication No. 2000-148254

SUMMARY

Technical Problems

In general, a body of the butterfly valve is heated to prevent impurities from adhering to a valve seat. In the butterfly valve, however, an elastic seal member formed with the valve seat may deteriorate, causing internal leakage. When a vacuum pressure control apparatus is used in a semiconductor manufacturing process, toxic gas may be used in some cases. In an emergency stop of the vacuum pressure control apparatus, leakage of such a toxic gas should be inhibited to ensure the safety.

The present invention has been made to solve the above problems and has a purpose to provide a vacuum pressure control apparatus capable of preventing occurrence of internal leakage even if an elastic seal member is deteriorated.

Means of Solving the Problems

To achieve the above purpose, one aspect of the present invention provides a vacuum pressure control apparatus including: an annular elastic seal member formed with a valve seat, and a doubly eccentric butterfly valve element configured to come into contact or separate from the valve seat, wherein the vacuum pressure control apparatus is to be placed on a pipe connecting a vacuum chamber and a vacuum pump, wherein the vacuum pressure control apparatus is configured to rotate the butterfly valve element in a first direction from a first valve closed position corresponding to an initial state to change vacuum pressure in the vacuum chamber, and wherein the vacuum pressure control apparatus further includes a control unit configured to rotate the butterfly valve element in a direction opposite to the first direction so that the butterfly valve element is moved to a second valve closed position different from the first valve closed position.

Herein, the first direction means a direction to separate a part of the butterfly valve element, the part being a major segment having an arc more than half of a circumference of the butterfly valve element, from the valve seat. Accordingly, another part of the butterfly valve element, this part being a minor segment having a shorter arc of the circumference of the butterfly valve element, is moved toward contact with the valve seat.

Advantageous Effects

With the aforementioned configuration, the vacuum pressure control apparatus can move the butterfly valve element to the second valve closed position in case the elastic seal member deteriorates, so that the valve can be placed in a closed state. Thus, internal leakage is less likely to occur in the vacuum pressure control apparatus. This vacuum pressure control apparatus can ensure safety in an emergency stop even when the apparatus is used in a semiconductor manufacturing process.

DETAILED DESCRIPTION OF THE EXEMPLARY EMBODIMENTS

A detailed description of an embodiment of a vacuum pressure control apparatus which is one of typical embodiments of the present invention will now be given referring to the accompanying drawings.

First Embodiment

Figure 1:
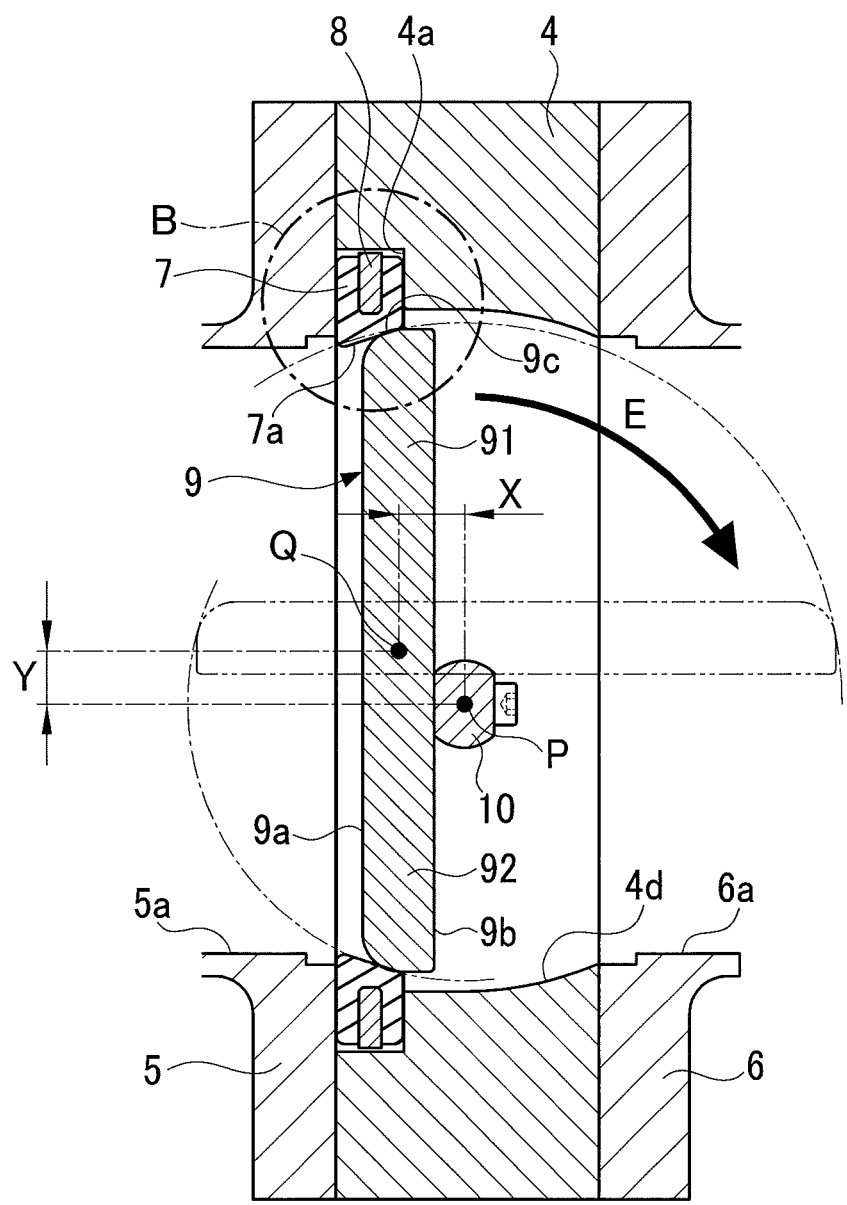
FIG. 1 shows a part of a vacuum pressure control apparatus in a first embodiment in which a butterfly valve element is in a first valve closed position, corresponding to a sectional view taken along a line A-A in FIG. 5.
Figure 2:
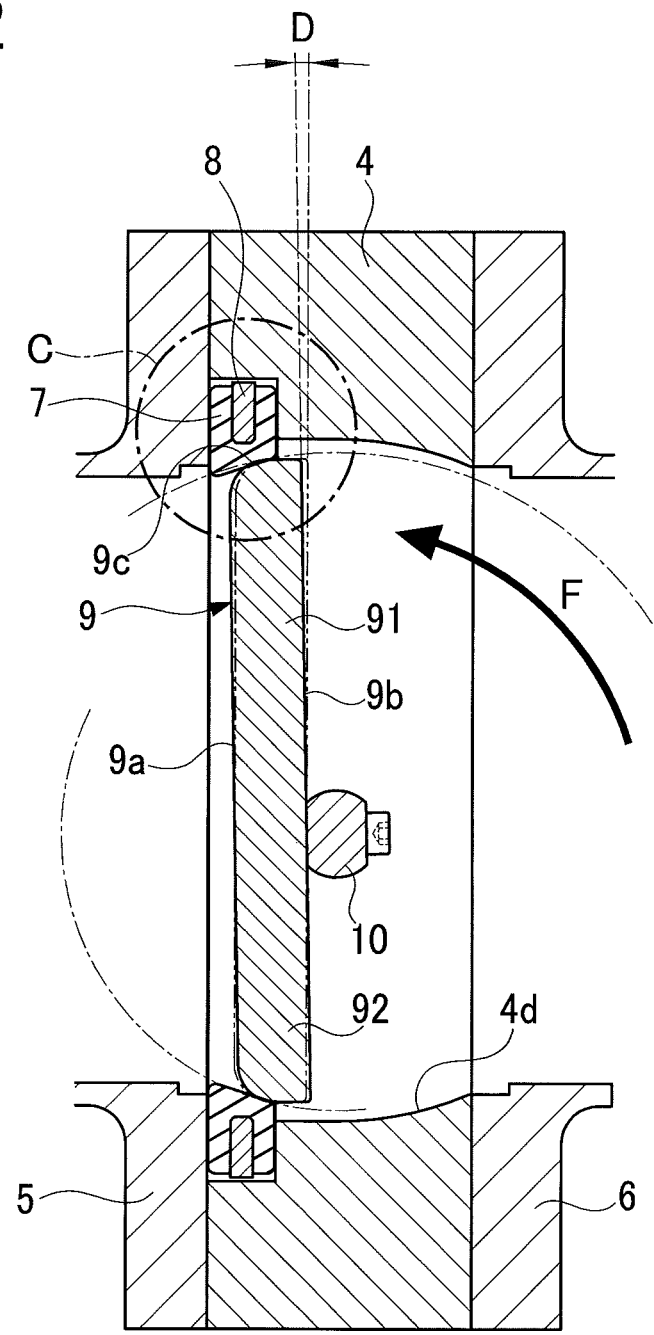
FIG. 2 shows the part of the vacuum pressure control apparatus in the first embodiment in which the butterfly valve element is in a second valve closed position, corresponding to the sectional view taken along the line A-A in FIG. 5.
Figure 3:
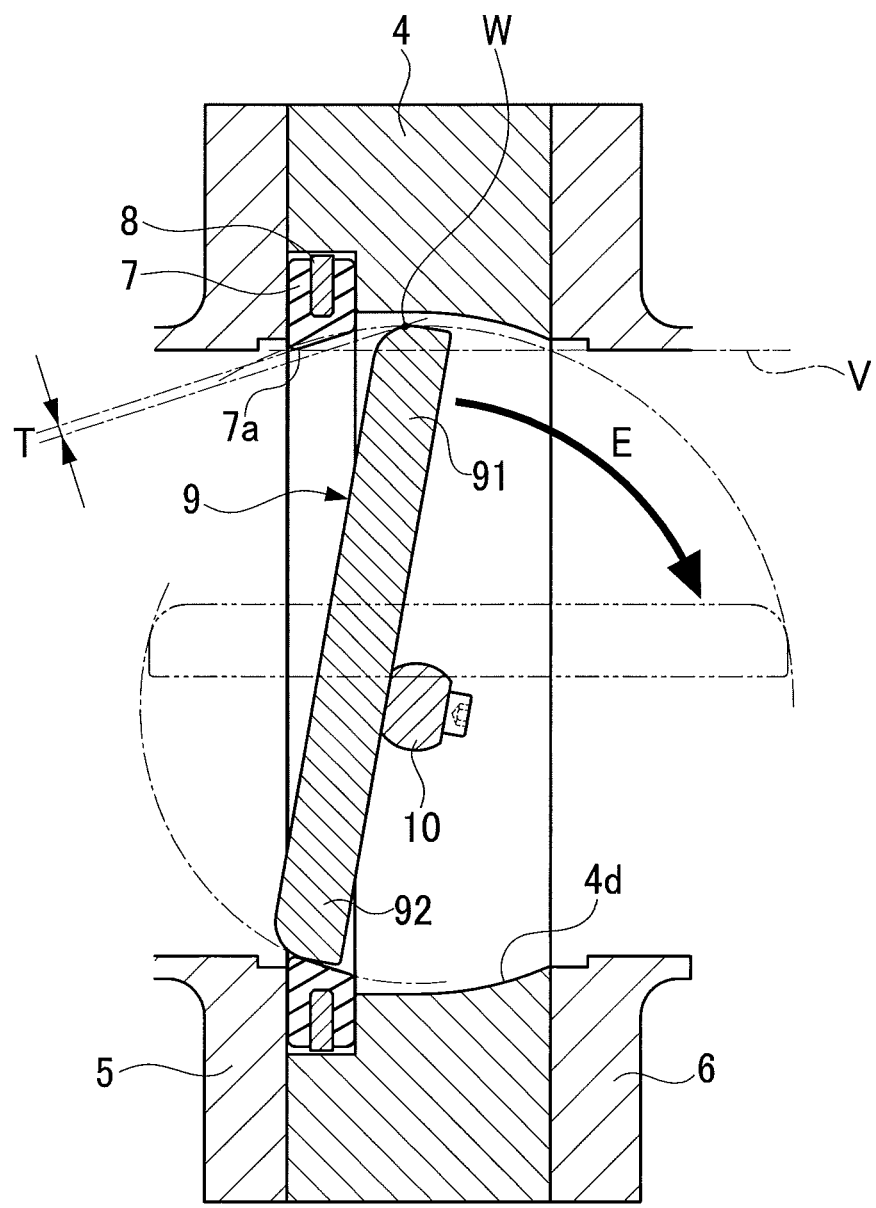
FIG. 3 shows the part of the vacuum pressure control apparatus in the first embodiment in which the butterfly valve element is in a first valve open position, corresponding to the sectional view taken along the line A-A in FIG. 5.
Figure 4:
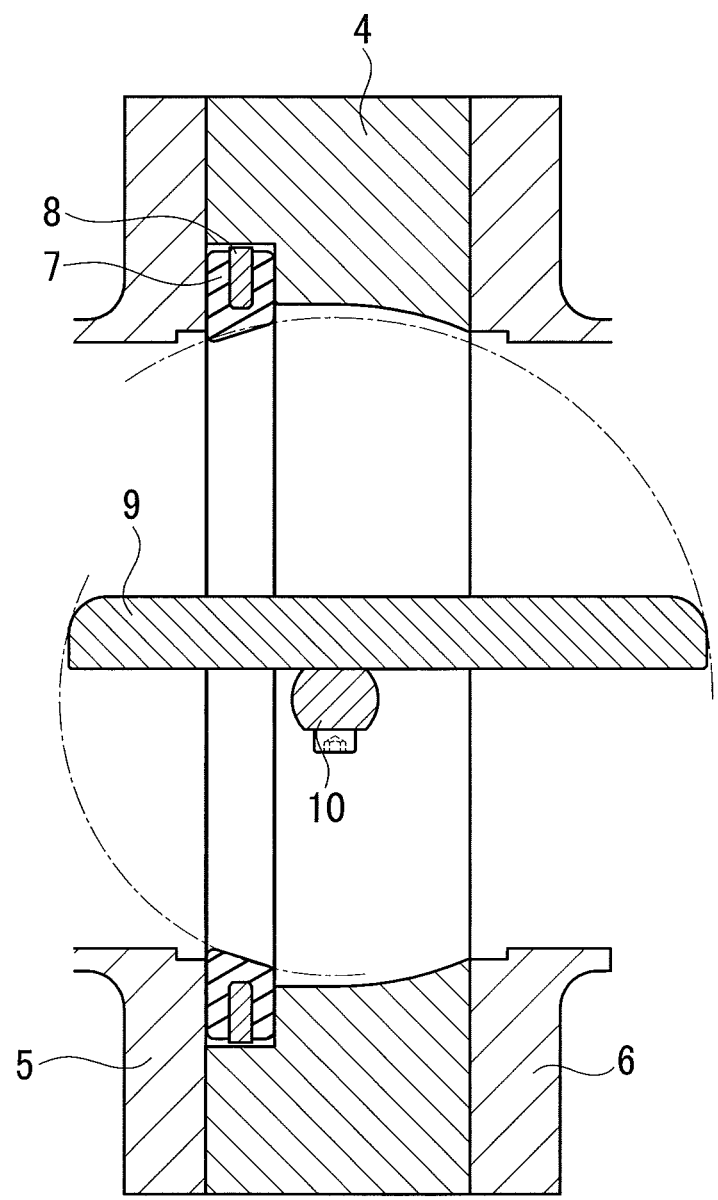
FIG. 4 shows the part of the vacuum pressure control apparatus in the first embodiment in which the butterfly valve element is in a second valve open position, corresponding to the sectional view taken along the line A-A in FIG. 5.
Figure 5:
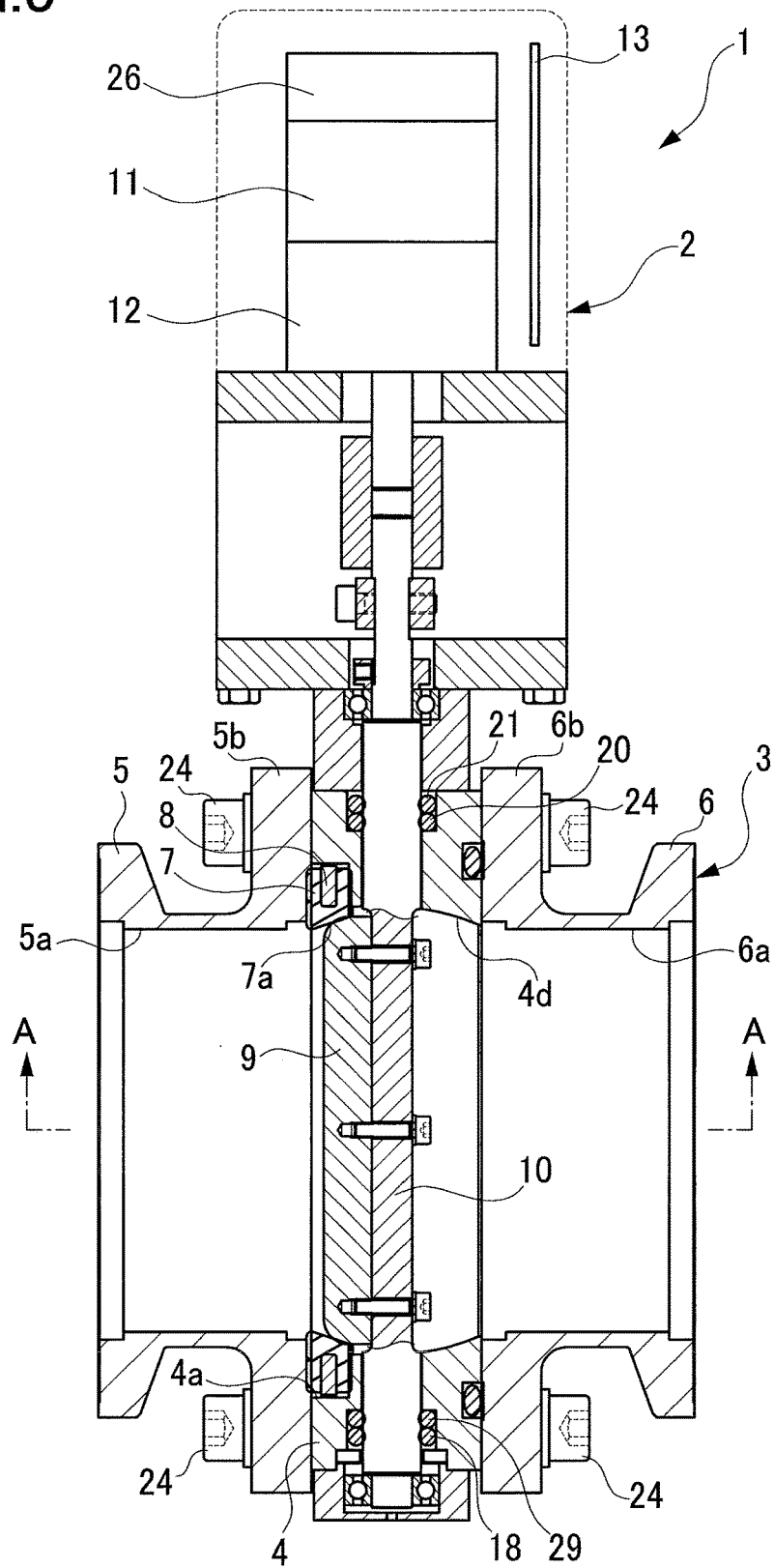
FIG. 5 is a sectional view of the vacuum pressure control apparatus in the first embodiment.
Figure 6:
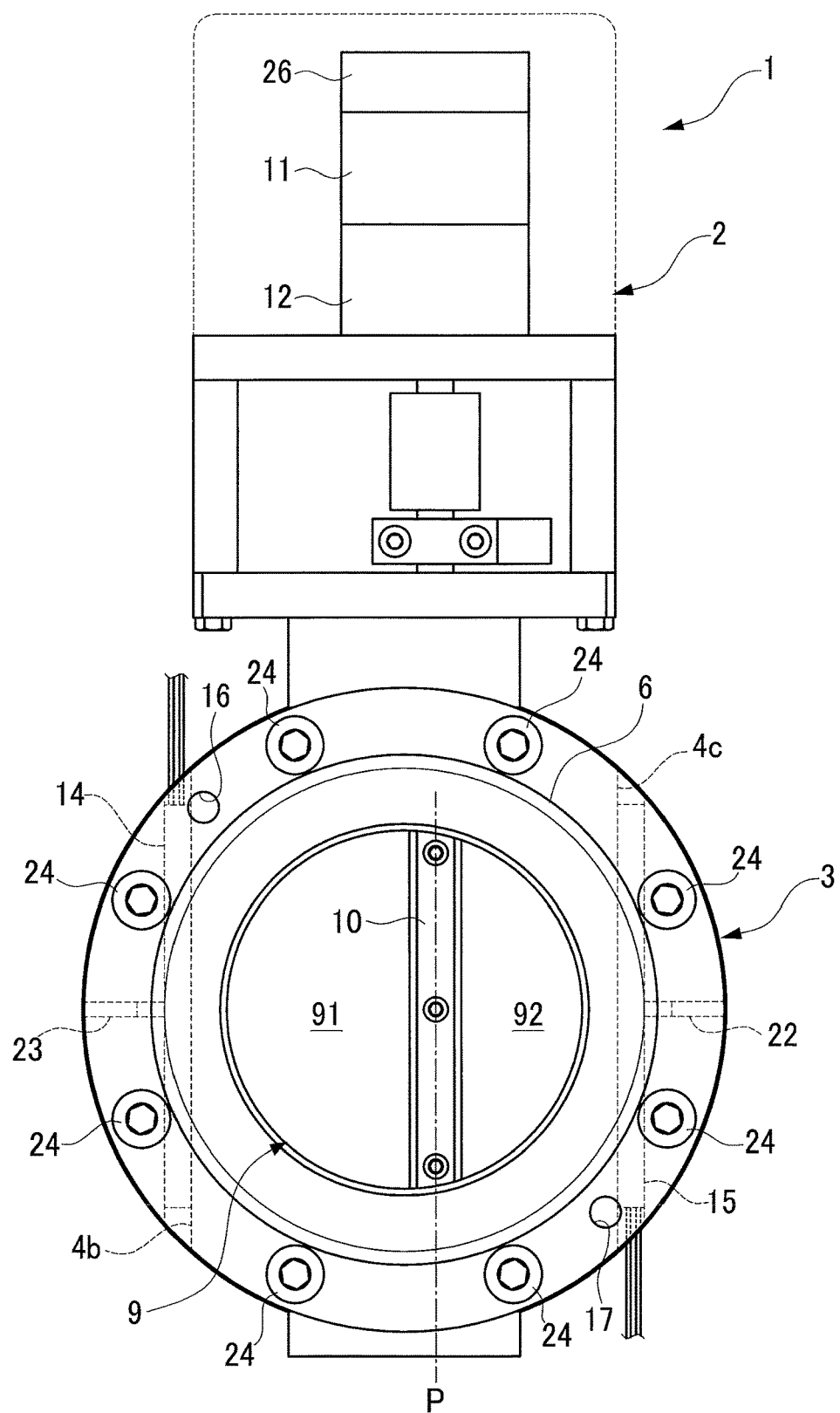
FIG. 6 is a right side view of the vacuum pressure control apparatus in the first embodiment.
Figure 7:
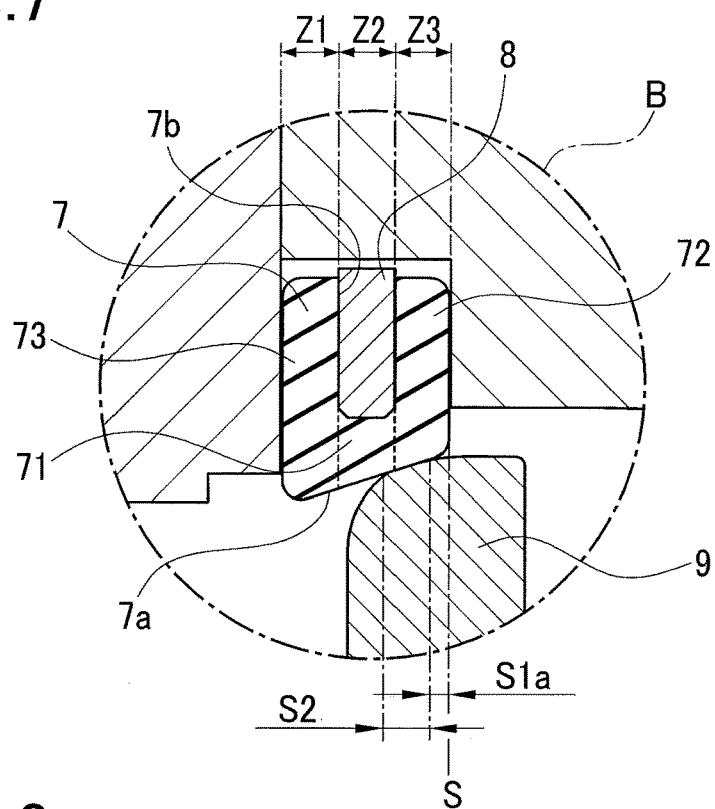
FIG. 7 is an enlarged view of a part B in FIG. 1.
Figure 8:
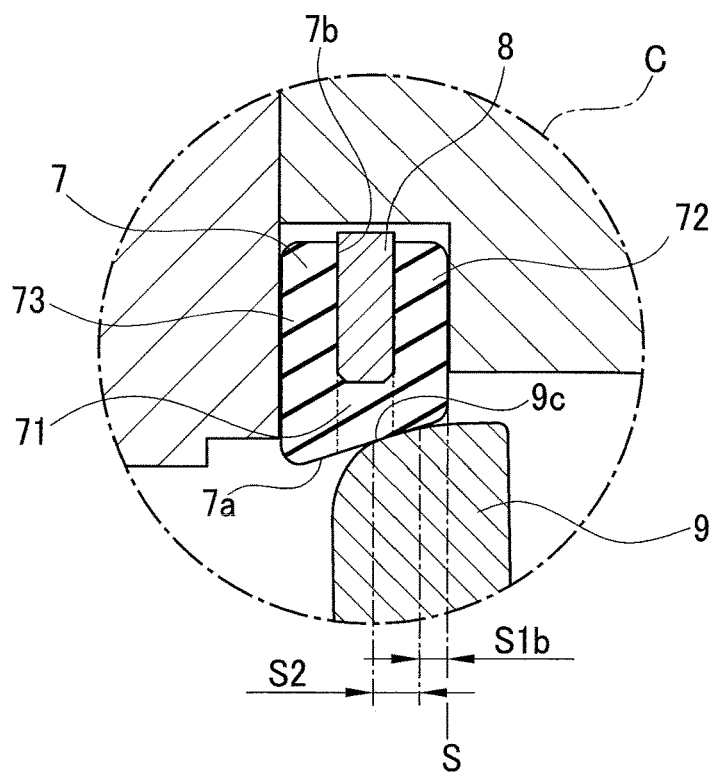
FIG. 8 is an enlarged view of a part C in FIG. 2.
Figure 9:
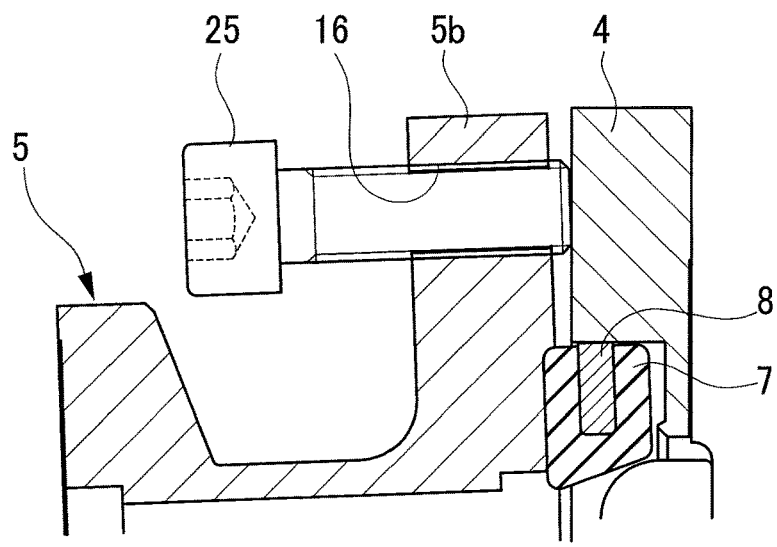
FIG. 9 is a view showing a structure to detach the elastic seal member.
Figure 10:
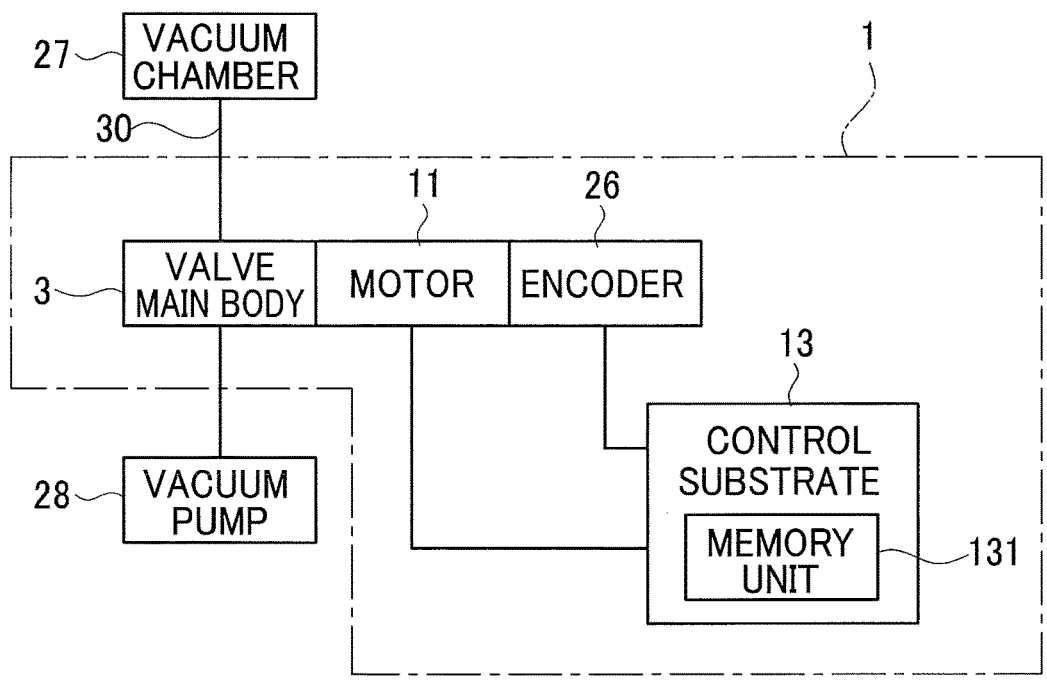
FIG. 10 is a block diagram showing a configuration of the vacuum pressure control apparatus.

A vacuum pressure control apparatus 1 in a first embodiment according to the invention will be described below with reference to FIGS. 1 to 8. FIG. 5 is a sectional view of the vacuum pressure control apparatus 1 in the first embodiment. FIGS. 1 to 4 are sectional views of a part of the vacuum pressure control apparatus 1 taken along a line A-A in FIG. 5. Specifically, FIG. 1 shows the apparatus 1 in which a butterfly valve element (hereinafter, also referred simply to as a "valve element") 9 is in a first valve closed position, and FIG. 2 shows the apparatus 1 in which the valve element 9 is in a second valve closed position. FIG. 3 shows the apparatus 1 in which the valve element 9 is in a first valve open position, and FIG. 4 shows the apparatus 1 in which the valve element 9 is in a first valve open position. In the present disclosure, the first valve closed position represents a position of the valve element 9 that is in an initial (normal) state, and the second valve closed position represents a position of the valve element 9 that is in a state rotated in a direction F opposite to a first direction E. The first valve open position represents a position of the valve element 9 that is in a state rotated in the first direction E so that only a first element valve part 91 which is a part of the valve element 9 is opened, and the second valve open position represents a position of the valve element 9 that is in a state rotated in the first direction E so that both the first valve element part 91 and a second valve element part 92 are completely closed. FIG. 6 is a right side view of the vacuum pressure control apparatus 1 in the first embodiment. FIG. 7 is an enlarged view of a part B in FIG. 1. FIG. 8 is an enlarged view of a part C in FIG. 2. FIG. 9 is a view showing a structure to detach the elastic seal member. FIG. 10 is a block diagram showing a structure of the vacuum pressure control apparatus 1.

The control apparatus 1 mainly includes a drive unit 2 and a valve main unit 3, as shown in FIG. 5. The drive unit 2 includes a motor 11, a reduction gear 12, an encoder 26, and a control substrate 13. As shown in FIG. 10, the control substrate 13 includes a memory unit 131. In the memory unit 131, fixed values indicating the predetermined first valve closed position and the predetermined second valve closed position of the valve element 9 described below are stored in advance. The control substrate 13 is an example of a "control unit" of the invention.

As shown in FIG. 10, the valve main unit 3 is positioned on a pipe 30 which connects a vacuum chamber 27 and a vacuum pump 28. As shown in FIG. 5, the valve main unit 3 includes the butterfly valve element 9, a cylindrical body 4 to which the valve element 9 is attached, and stainless-steel connectors 5 and 6 positioned at both sides of the body 4. The connector 5 is formed with a passage 5a and a flange 5b. The connector 6 is formed with a passage 6a and a flange 6b. The connector 5 is connected to the vacuum pump 28, and the connector 6 is connected to the vacuum chamber 27. As shown in FIG. 6, in each of the flange 5b and the flange 6b, eight screws 24 are attached circumferentially to fix the connectors 5 and 6 to the body 4, and screw holes 16 and 17 are formed to detach the connectors 5 and 6 from the body 4. Although the connector 6 is shown in FIG. 6 and the connector 5 is not illustrated therein, the connector 5 has the same structure as the connector 6 and thus the details of the connector 5 are omitted. In this embodiment, the connector 5 is connected to the vacuum pump 28 and the connector 6 is connected to the vacuum chamber 27. Alternatively, the connector 5 may be connected to the vacuum chamber 27 and the connector 6 may be connected to the vacuum pump 28.

As shown in FIG. 5, the body 4 is formed with a valve hole 4d defined by an inner wall having an arched cross section. At one end of the body 4 in its axial direction (namely, on one side of the body 4 to which the connector 5 is connected in FIG. 5), a recess 4a is formed radially outside of the valve hole 4d. In this recess 4a, an annular elastic seal member 7 made of rubber is mounted and sandwiched between the body 4 and the connector 5.

The elastic seal member 7 is formed with a valve seat 7a on an inner peripheral surface. The elastic seal member 7 is further formed with an annular groove 7a open on one side (on an outer peripheral surface) Thus, the elastic seal member 7 has a U-shaped cross section as shown in FIG. 7. The elastic seal member 7 includes a thin part 71 formed with the annular groove 7b and thick parts 72 and 73 located on both sides of the thin part 71. An axial distance (thickness) Z1 of the thick part 73, an axial distance (thickness) Z2 of the guide member 8 (or the thick part 71), and an axial distance (thickness) Z3 of the thick part 72 are equal as each other (Z1:Z2:Z3=1:1:1). In the annular groove 7b, an annular guide member 8 is fitted so as to protrude from the annular groove 7b. In semiconductor manufacturing equipment, a part(s) or component(s) which may be exposed to gas has to be made of corrosion-resistant materials. However, the materials of the guide member 8 are not limited to the above mentioned because the guide member 8 is insulated from the part(s) or component(s) exposed to gas by the elastic seal member 7. Also, a method for connecting the elastic seal member 7 and the guide member 8 is not limited to the above mentioned manner and any other methods, such as a bonding method using an adhesive or the like or an integral molding method, may be adopted. During disassembly of the valve main unit 3, such as during maintenance, even if the elastic seal member 7 has stuck to the body 4, the elastic seal member 7 can be reliably demounted from the body 4 by support of the guide member 8. In the absence of the guide member 8, the elastic seal member 7 may be partly torn off or the surface of the elastic seal member 7 may be scratched during disassembly of main unit 3. Further, to change the sealing performance and the sealing characteristic such as reaction force of the elastic seal member 7, the thickness of the guide member 8 has only to be changed.

The body 4 is formed, as shown in FIG. 6, with holes 4b and 4c to fix therein heaters 14 and 15. Accordingly, the heaters 14 and 15 are located inside the body 4, so that the body 4 can be heated up directly. The heaters 14 and 15 are secured by, for example, locking screws 22 and 23 from an outside surface of the body 4. The heaters 14 and 15 are detachable. Further, the outside surface of the body 4 is wrapped with a heat insulating material (not shown), so that a heating efficiency can be enhanced and also a thermocouple or a thermostat can be fixed on either the body 4 or the heat insulating material.

The elastic seal member 7 is fixed to the side of the body 4 and thus the body 4 can be heated up directly by the heaters 14 and 15, so that the elastic seal member 7 itself is less likely to cool down. Accordingly, it becomes hard for product materials to adhere to the elastic seal member 7 when sealing. Thus, the sealing performance can be maintained.

As shown in FIG. 5, the valve element 9 is brought into contact with or separated from the valve seat 7a by rotation of a rotating shaft 10 on the same axis as that of the drive unit 2. A rotation angle of the rotating shaft 10 is detected by the encoder 26 and the rotating shaft 10 is rotated by the motor 11 equipped with a reduction gear 12. Accordingly, the motor 11 with reduced size can be achieved and further an opening degree (hereinafter, also referred simply to as an "opening") of the valve element 9 can be ascertained even if a power source of the motor 11 is disconnected. In the doubly eccentric valve element, the valve element 9 may rotate by a differential pressure in the absence of a force holding the valve element 9. Therefore, even if the power source is disconnected, the reducing gear 12 is selected to prevent the rotating shaft 10 from rotating at a rotary torque generated by the differential pressure. Further, the motor 11 generates a holding torque of the motor 11 itself such as detent torque. Thus, the motor 11 and the reducing gear 12 are operated in combination to hold the valve element 9 against movement when the power source is disconnected. 0 rings 18, 29, 20, and 21 for sealing are positioned between the rotating shaft 10 and the body 4.

As shown in FIG. 1, a central axis P of the rotating shaft 10 is eccentric at a distance X from the central point Q of the valve element 9 in a direction of the central axis of the passages 5a and 6a and further eccentric at a distance Y from the central point Q in a direction perpendicular to the central axis of the passages 5a and 6a. The valve element 9 includes a first surface 9b on which the rotating shaft 10 is placed, and a second surface 9a having a peripheral edge portion 9c which comes into contact with the valve seat 7a. The peripheral edge portion 9c is formed as a curved surface with a predetermined curvature. When the predetermined curvature is large, the peripheral edge portion 9c can have a wide contact surface S which contacts with the elastic seal member 7. Therefore, when a permeable gas such as helium is used, the gas is less likely to pass between the first surface 9b and the elastic seal member 7. The valve element 9 includes, as shown in FIGS. 1 and 6, the first valve element part 91 which is a major segment having an arc more than half the circumference of the valve element 9 and the second valve element part 92 which is a minor segment having a shorter arc of the circumference of the valve element 9 than the arc of the first valve element part 91.

Figure 11:
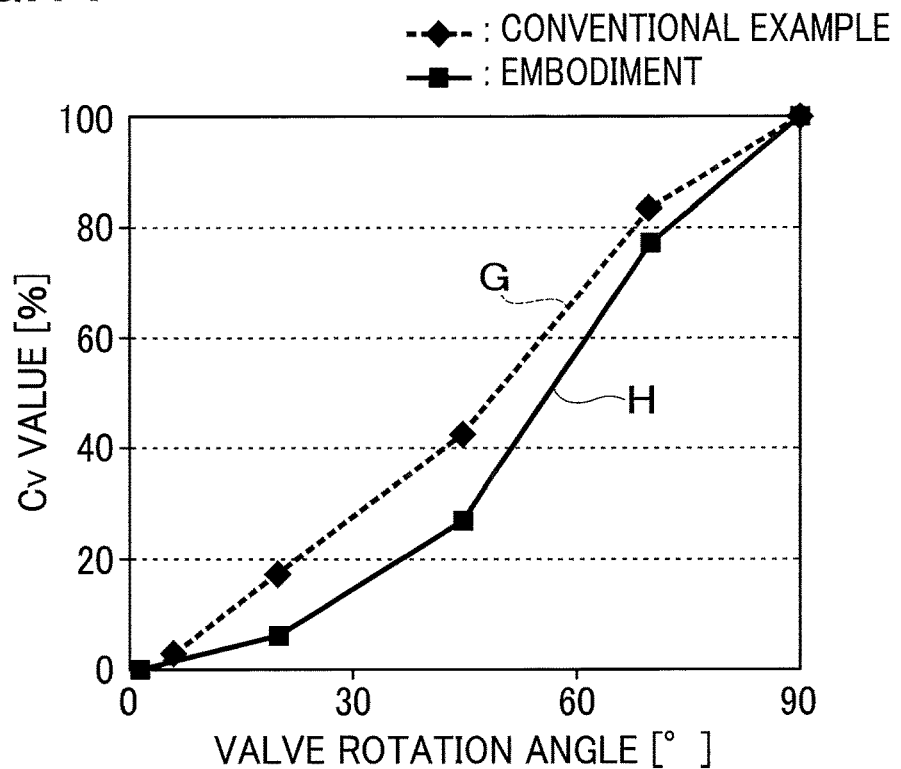
FIG. 11 is a graph showing a relationship between a rotation angle of the butterfly valve element and a Cv value.
Figure 12:
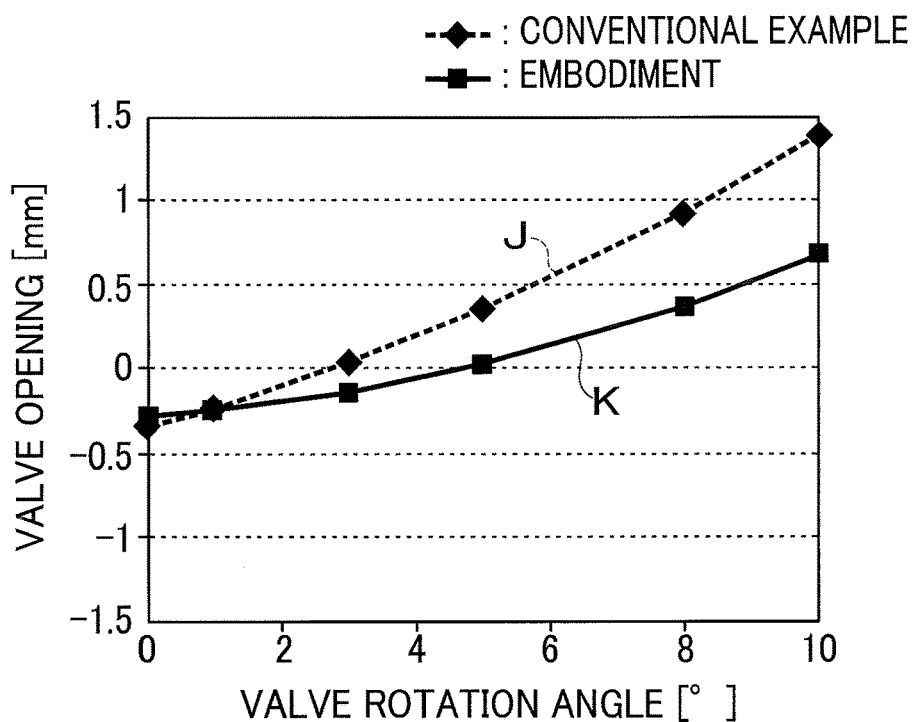
FIG. 12 is a graph showing a relationship of the rotation angle of the valve element and an opening of a first valve element part.
Figure 13:
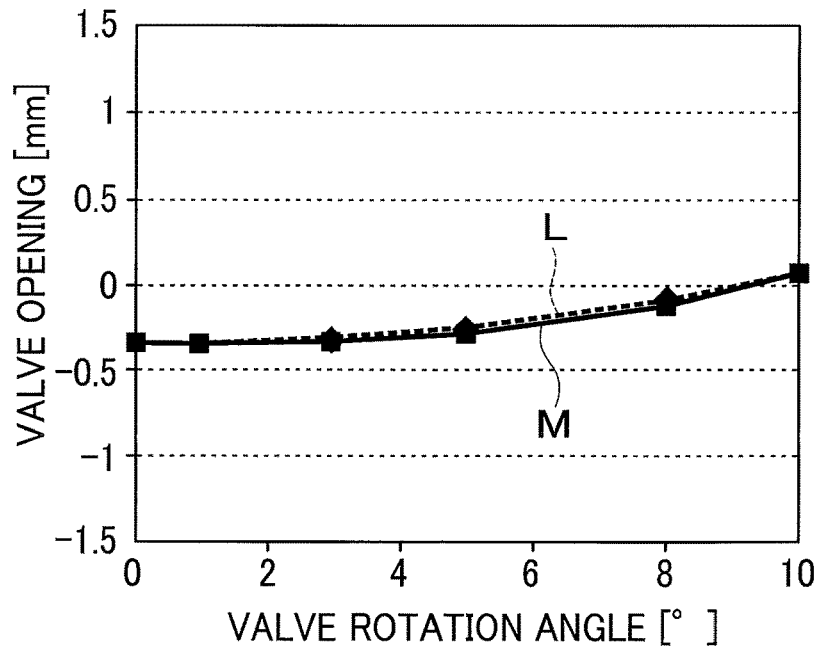
FIG. 13 is a graph showing a relationship of the rotation angle of the valve element and an opening of a second valve element part.
Figure 14:
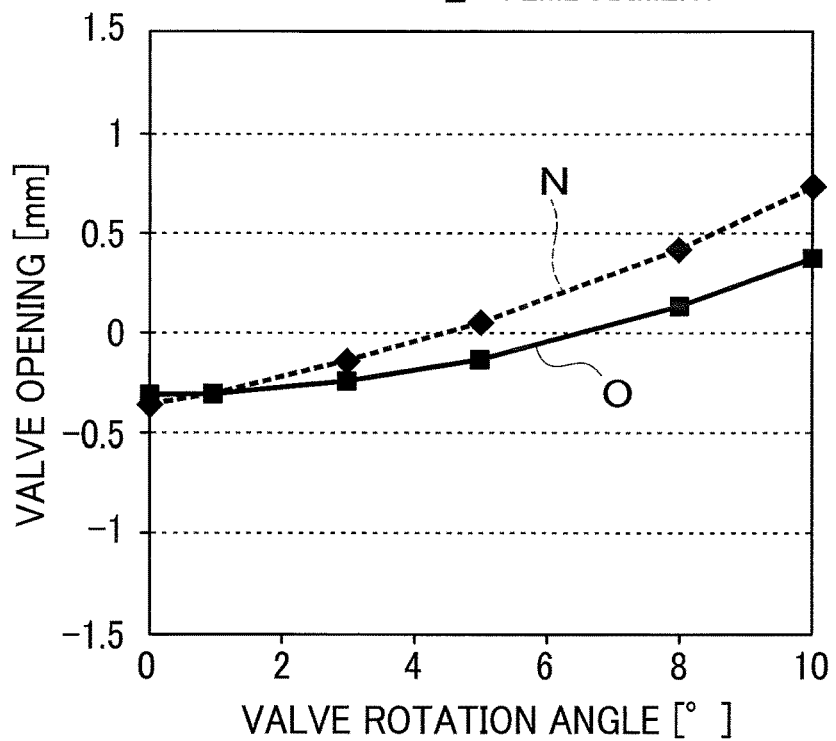
FIG. 14 is a graph showing a relationship of the rotation angle of the valve element and an average opening of the first and second valve element parts.

Next, operation of the vacuum pressure control apparatus 1 will be described with reference to FIGS. 11 to 14. FIG. 11 is a graph showing a relationship between a rotation angle of the valve element 9 and a Cv value. In FIG. 11, a horizontal axis represents the rotation angle of the valve element 9 and a vertical axis represents the Cv value. In FIG. 11, data of a conventional example is indicated with a dotted line G and data of the present embodiment is indicated with a solid line H. FIG. 12 is a graph showing a relationship between the rotation angle of the valve element 9 and the opening of the first valve element part 91 (denoted by T in FIG. 3). In FIG. 12, data of the conventional example is indicated with a dotted line J and data of the present embodiment is indicated with a solid line K. FIG. 13 is a graph showing a relationship between the rotation angle of the valve element 9 and the opening of the second valve element part 92. In FIG. 13, data of the conventional example is indicated with a dotted line L and data of the present embodiment is indicated with a solid line M. FIG. 14 is a graph showing a relationship between the rotation angle of the valve element 9 and an average opening of the openings of the first valve element part 91 and the second valve element part 92. In FIG. 14, data of the conventional example is indicated with a dotted line N and data of the present embodiment is indicated with a solid line O. In FIGS. 12 to 14, a horizontal axis represents the rotation angle of the valve element 9 and a vertical axis represents the opening of the valve element 9. Positive values of the valve opening indicate a valve open state of the valve element 9 and negative values of the valve opening indicate a valve closed state in which the elastic seal member 7 is in a deformed state.

In an initial valve closed state, the valve element 9 is positioned at the first valve closed position as shown in FIG. 1. When the valve is opened under near atmospheric pressure, the valve element 9 is rotated in the first direction E to the first valve open position. In this position, only the first valve element part 91 is separated from the valve seat 7a, while the second valve element part 92 is in contact with the valve seat 7a. Herein, the first direction E means a direction to separate the doubly eccentric first valve element part 91 from the valve seat 7a. Thus, the second valve element part 92 is moved in a direction to contact with the valve seat 71. The valve element 9 moves along with the inner wall, arched in cross section, of the valve hole 4d of the body 4. As shown in FIG. 3, when the opening T is small, the top W of a curved section of the peripheral edge portion 9c of the valve element 9 is positioned above (outside) the height (i.e., the upper end indicated by a chain line V in FIG. 3) of the passages 51 and 6a, so that the passages 5a and 6a can be restricted. Therefore, the gas does not flow sharply when the opening T is small, and thus the controllability can be improved.

When the valve element 9 is further rotated in the first direction E as shown in FIG. 4, the valve element 9 is placed in a valve fully open state in which the first valve element part 91 and the second valve element 92 are open. normal operation of the vacuum pressure control apparatus 1, the opening of the valve element 9 is set at the first valve closed position, the first valve open position, the second valve open position, or each intermediate position.

The first valve closed position and the second valve closed position are determined in such a manner that a rotation angle of the rotation shaft 10 is first detected with the encoder 26, and the valve closed position is ascertained based on the detected angle. By use of a stepping motor as the motor 11, secondly, a mechanical stop (i.e., a step-out position of the stepping motor) is set at the second valve closed position, and the valve closed position is controlled and grasped based on an angle signal measured by encoder 26 with reference to each position at which the motor stops rotating. Instead of the encoder 26, a potentiometer may be used.

In the case of using any valve, other than the doubly eccentric valve, during valve closing under atmospheric pressure, a valve element tends to be closed drastically near the valve fully closed position, resulting in poor controllability. In contrast, in the present embodiment using the doubly eccentric butterfly valve element 9, as indicated by the line K in FIG. 12, the line M in FIG. 13, and the line O in FIG. 14, the valve opening moderately varies as compared with the lines J, L, and N in the conventional examples. That is because the valve opening of only the first valve element part 91 can be adjusted and controlled for pressure control to be performed near the valve fully closed position under near atmospheric pressure, so that more delicate pressure can be controlled than when the openings of both the first valve element part 91 and the second valve element valve 92 are controlled.

Herein, the body 4 is generally heated up to prevent the deposition of impurities on the valve seat 7a. However, as the elastic seal member 7 formed with the valve seat 7a deteriorates due to age variation, internal leakage of gas may occur through gaps caused between the deteriorated valve seat 7a and the valve element 9. When a vacuum pressure control apparatus is used in a semiconductor manufacturing process, toxic gas may be used in some cases. In an emergency stop of the vacuum pressure control apparatus, leakage of such a toxic gas should be inhibited to ensure the safety.

At the first valve closed position, as shown in FIG. 7, the valve element 9 is disposed such that a contact surface S2 of the peripheral edge portion 9c contacting with the elastic seal member 7 is mostly located on the thick part 72 and partly located on the thin part 71. Concretely, the contact surface S2 is positioned at the distance S1a from an end surface S of the thick part 72 of the elastic seal member 7 (namely, surface of the thick part 72 contacting with the recess 4a of the body 4). The elastic seal member 7 deteriorates due to age variation after repeated motions of the pressure control valve et al., so that the elastic seal member 7 wears out, and the seal performance deteriorates.

The second valve closed position is, as shown in FIG. 2, different from the first valve closed position. Specifically, the valve element 9 is rotated by a distance D from the first valve closed position in the direction F opposite to the first direction E to move to the second valve closed position. As shown in FIG. 8, specifically, the valve element 9 is rotated, moving the contact surface S2 from the position on the thick part 72 toward the thin part 71 until the contact surface S2 is disposed at a distance S1b from the end surface S of the thick part 72 of the elastic seal member 7. The distance S1b is longer than the distance S1a determined when the valve element 9 is located at the first valve closed position (S1a<S1b). A part of the contact surface S2 of the valve element 9 contacting with the elastic seal member 7 at the second valve closed position is not used as the contact surface S2 of the valve element 9 contacting with the elastic seal member 7 at the first valve closed position. Thus, the part of the contact surface S2 not contacting the elastic seal member 7 when the valve element 9 is at the first valve closed position does not deteriorate due to age variation. Therefore, even if the contact surface S2 of the valve element 9 positioned at the first valve closed position deteriorates due to age variation, the contact surface S2 of the valve element 9 at the second valve closed position can sealingly contact the elastic seal member 7. Also, when the valve element 9 is located at the second valve closed position, the contact surface S2 contacts, or presses, the thin part 71, so that a reaction force generated by deforming (pressing) the elastic seal member 7 (the thin part 71) can be obtained largely. This can enhance the sealing performance.

Further, in the first valve open position shown in FIG. 3, the second valve element part 92 is in contact with the thick part 73, so that the rotary torque of the rotating shaft 10 can be decreased even if the reaction force from the thick part 73 is small.

In the vacuum pressure control apparatus 1 in this embodiment, during maintenance, the connector 5 has only to be removed from the body 4 to demount the elastic seal member 7, so that the workability can be improved. The connectors 5 and 6, the elastic seal member 7, the valve element 9, and the rotating shaft 10 can be easily disassembled. Specifically, this disassembly can be easily performed by simply removing the screws 24 fixing the flanges of the connectors 5 and 6. Thus, it is possible to clean product materials from the disassembled parts or components, and reuse the vacuum pressure control apparatus 1. It is also easy to replace consumable items, such as the elastic seal member 7 and each of O rings 18, 29, 20, and 21 sealing the rotating shaft 10.

The elastic seal member 7 stuck due to heating or the like can be easily demounted from the body 4 during disassembly in maintenance and others. When the body 4 is heated up, the elastic seal member 7 may be stuck between the body 4 and the connector 5. This sticking force may be so strong as to make it difficult to demount the elastic seal member 7. As shown in FIG. 9, therefore, the flange 5b of the connector 5 is formed with a screw hole 16 in which a screw 25 is inserted, so that the connector 5 can be detached from the body 4. Since the screw hole 16 is identical in structure to a screw hole 17, only the screw hole 16 is shown in FIG. 9. As screws to be inserted in the screw holes 16 and 17, any of the eight screws 24 fixing the flange 5b of the connector 5 may be utilized after being removed from the connector 5. Thus, no special screws need to be prepared. As another alternative, a gap may be formed in advance between the connector 5 and the body 4 so that the connector 5 is detached from the body 4 by leverage.

As described above, the vacuum pressure control apparatus 1 in the present embodiment can provide the following operations and effects.

(1) A vacuum pressure control apparatus 1 includes the annular elastic seal member 7 formed with the valve seat 7a, and the doubly eccentric butterfly valve element 9 configured to come into contact or separate from the valve seat 7a. The vacuum pressure control apparatus 1 is to be placed on the pipe 30 connecting the vacuum chamber 27 and the vacuum pump 28. The vacuum pressure control apparatus 1 is configured to rotate the butterfly valve element 9 in a first direction from a first valve closed position corresponding to an initial state to change vacuum pressure in the vacuum chamber 27. The vacuum pressure control apparatus 1 further includes the control unit 13 configured to rotate the butterfly valve element 9 in a direction F opposite to the first direction E so that the butterfly valve element 9 is moved to a second valve closed position different from the first valve closed position. Accordingly, the vacuum pressure control apparatus 1 can move the butterfly valve element 9 to the second valve closed position in case the elastic seal member 7 deteriorates due to aged deterioration, so that the valve can be placed in a closed state. Thus, internal leakage is less likely to occur in the vacuum pressure control apparatus 1. This vacuum pressure control apparatus 1 can ensure safety in an emergency stop even when the apparatus 1 is used in an initial stage.

(2) In the vacuum pressure control apparatus 1 described in (1), the elastic seal member 7 is provided with the annular groove 7b to have a U-shaped cross section open on one side, and the vacuum pressure control apparatus 1 further includes the guide member 8 fitted in the annular groove 7b so that the guide member 8 annularly protrudes from the annular groove 7b. Accordingly, the valve element 9 applies the force in the rotating direction to the elastic seal member 7; however, the guide member 8 having sufficient height (more than a half of the total height of the elastic seal member 7) receives the applied force, so that the elastic seal member 7 can be fixed by the guide member 8 and thus the elastic seal member 7 does not fall off.

(3) In the vacuum pressure control apparatus 1 described in (2), after the elastic seal member 7 wears out due to aged deterioration by contact with the butterfly valve element when placed in the first valve closed position, the butterfly valve element is placed in the second valve closed position to provide a seal with respect to the elastic seal member. Accordingly, if the elastic seal member 7 deteriorates, internal leakage is less likely to occur in the vacuum pressure control apparatus 1, when the valve element 9 is in the second valve closed position.

(4) In the vacuum pressure control apparatus 1 described in one of (1) to (3), the butterfly valve element 9 has a surface including a circumferential edge portion 9c configured to come into contact with the valve seat 7a, the circumferential edge portion 9c being a curved surface. Accordingly, the valve element 9 has the large contact area which contacts with the elastic seal member 7, enabling a reduction in the amount of deformation of the elastic seal member 7 and a decrease in the reaction force necessary for seal. Therefore, the deterioration of the elastic seal member 7 can be retarded, and the durability can be improved.

(5) In the vacuum pressure control apparatus 1 described in one of (1) to (4), further including: a body to which the butterfly valve is attached; and a connector connected to the body, wherein the elastic seal member is sandwiched between the body and the connector. Accordingly, the elastic seal member 7 can be easily demounted by simple detachment of the connector 5 during maintenance, so that the workability can be improved. In many cases, furthermore, the body 4 is heated during use. Therefore, even if the valve element 9 and the elastic seal member 7 stick together, the elastic seal member 7 sandwiched with the heated body 4 and the connector 5 is not pulled away by the valve element 9 moved to open or close. Thus, the elastic seal member 7 does not fall off.

Second Embodiment

Figure 15:
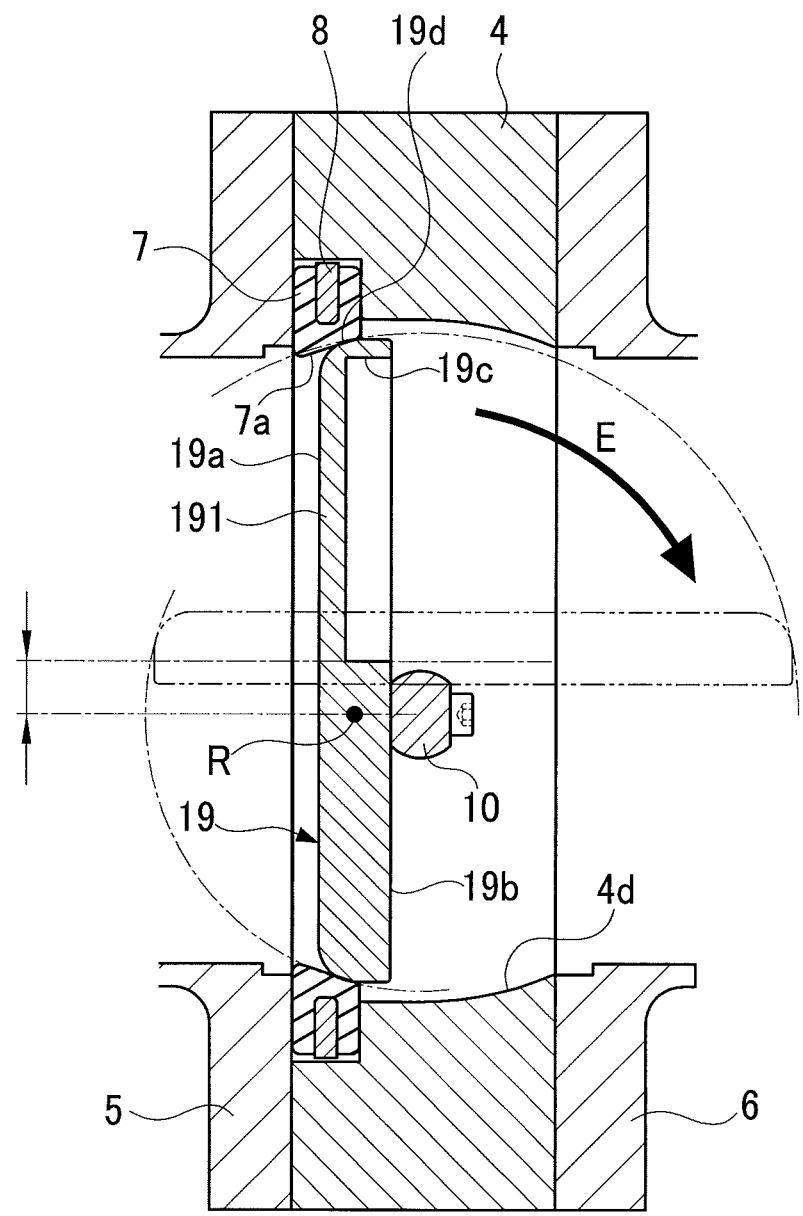
FIG. 15 is a sectional view of a vacuum pressure control apparatus in a second embodiment, in which a butterfly valve element is in a first valve closed position.
Figure 16:
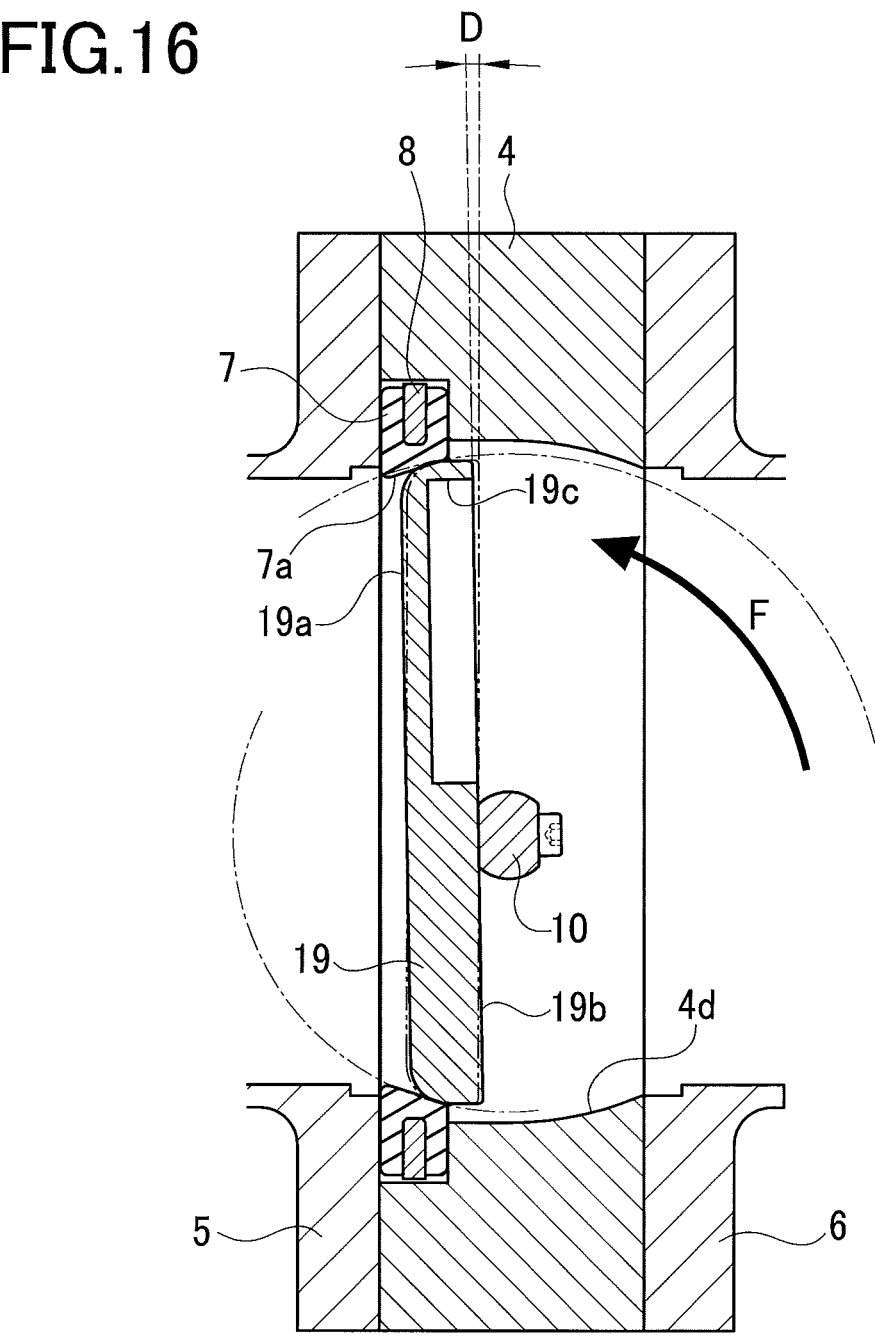
FIG. 16 is a sectional view of the vacuum pressure control apparatus in the second embodiment, in which the butterfly valve element is in a second valve closed position.
Figure 17:
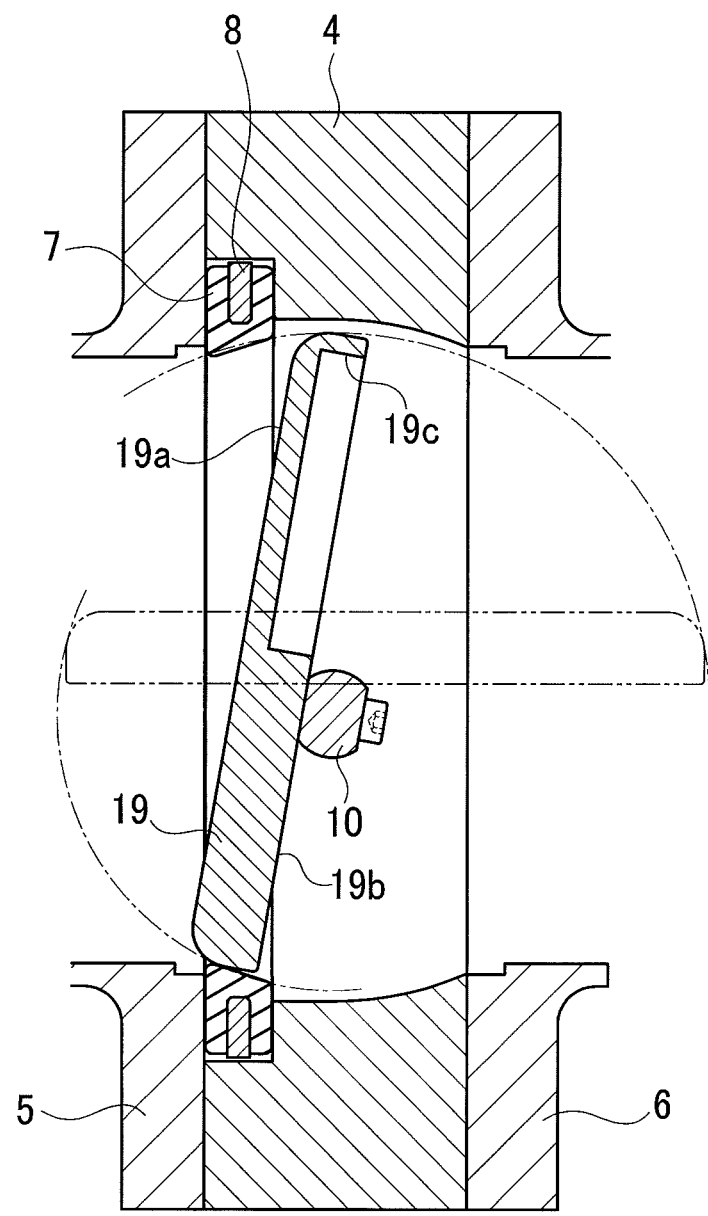
FIG. 17 is a sectional view of the vacuum pressure control apparatus in the second embodiment, in which the butterfly valve element is in a first valve open position.
Figure 18:
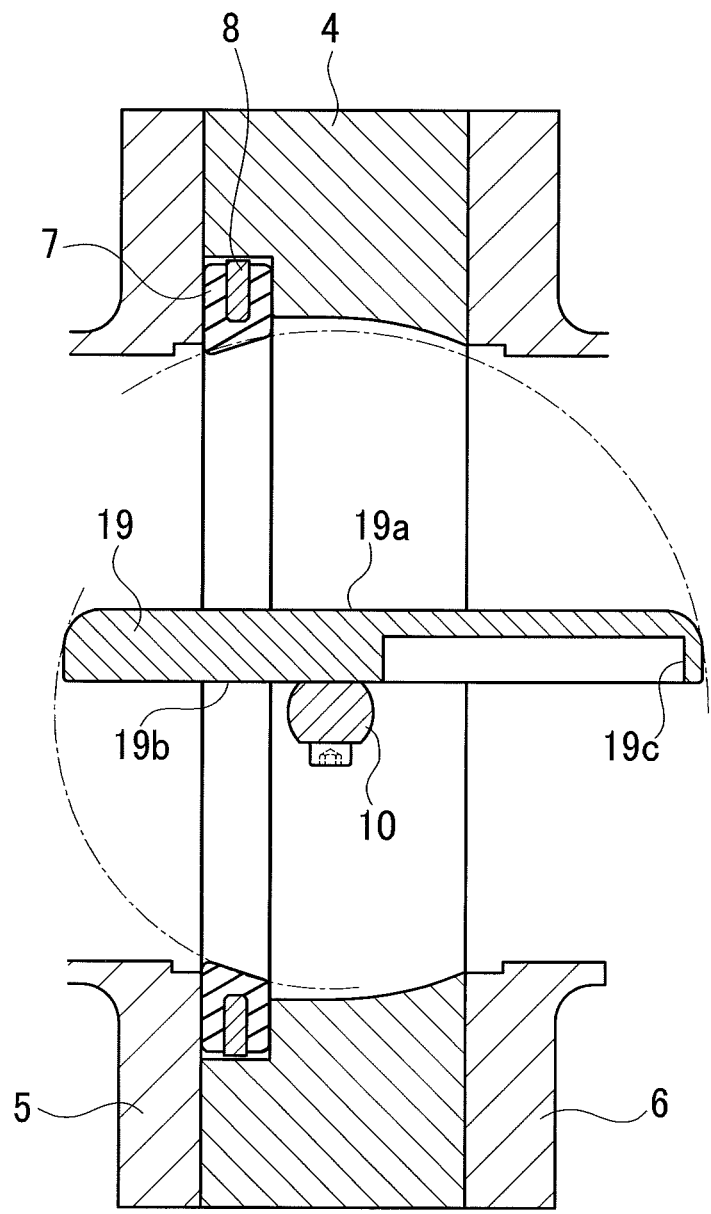
FIG. 18 is a sectional view of the vacuum pressure control apparatus in the second embodiment, in which the butterfly valve element is in a second valve open position.

A vacuum pressure control apparatus 1 in a second embodiment according to the invention will be described with FIGS. 15 to 18. FIG. 15 is a sectional view of a vacuum pressure control apparatus 1 in the second embodiment according to the invention, in which a butterfly valve element 19 is in the first valve closed position. FIG. 16 is a sectional view showing that the valve element 19 is in the second valve closed position. FIG. 17 is a sectional view showing that the valve element 19 is in the first valve open position. FIG. 18 is a sectional view showing that the valve element 19 is in the second valve open position.

The second embodiment mainly differs from the vacuum pressure control apparatus 1 in the first embodiment in the shape of the butterfly valve element. In the following description, accordingly, identical or similar structures of the vacuum pressure control apparatus 1 to those of the first embodiment are assigned with the same referential signs as those in the first embodiment and their explanations are omitted.

A butterfly valve element 19 in the second embodiment is, as shown in FIG. 15, formed with a second surface 19a having a peripheral edge portion 19d of a curved surface which will contact with the valve seat 7 and a first surface 19b opposite to the second surface 19a. The first surface 19b on which the rotating shaft 10 is placed is formed with a recess 19c in the first valve element part 191.

In the element valve 9 in the first embodiment, as shown in FIG. 1, the center of gravity is positioned at the center point Q of the element valve 9. In this configuration, an inertia moment is large. If the valve element 9 having a large inertia moment oscillates while being in contact with the elastic seal member 7, particles may be generated. Further, when stopped, the valve element 9 may overshoot by inertia force. Thus, the valve element 9 has low responsiveness at the time of stopping.

However, the valve element 19 in the second embodiment is formed with the recess 19c in the first surface 19b mounted thereon with the rotation shaft 10. The recess 19c is formed only between the rotation shaft 10 on the first surface 19b and the first valve element part 191. Therefore, as shown in FIG. 15, the center of gravity of the valve element 19 is positioned at a point R on the axis of the rotation shaft 10. Thus, the inertia moment of the valve element 19 is smaller than the inertia moment of the valve element 9 in the first embodiment. When the inertia moment is small, oscillation of the valve element 19 by the inertia moment is small and generation of particles can be suppressed during opening and closing the valve element 19. The valve element 19 configured as above does not overshoot at the time of stopping and thus has enhanced responsiveness.

As described above, the vacuum pressure control apparatus 1 in the second embodiment can provide the following operations and effects. The butterfly valve element 9 includes the second surface 19a and the first surface 19b opposite to the second surface 19a. The second surface 19a is configured to come into contact with the valve body 4. The first surface 19b is formed with the recess 19c. Accordingly, the center of gravity position of the valve element 19 is positioned at the point R on the axis of the rotation shaft 10, so that the radius of rotation (a distance between the rotating shaft 10 and the center of gravity position of the valve element 19) can be short. Accordingly, the inertia moment can be small.

The foregoing embodiments are mere examples and give no limitation to the present invention. The present invention may be embodied in other specific forms without departing from the essential characteristics thereof.

For instance, in the foregoing embodiments, the contact surface of the elastic seal member 7 is formed linearly, but it is possible to be a curved surface.

Figure 19:
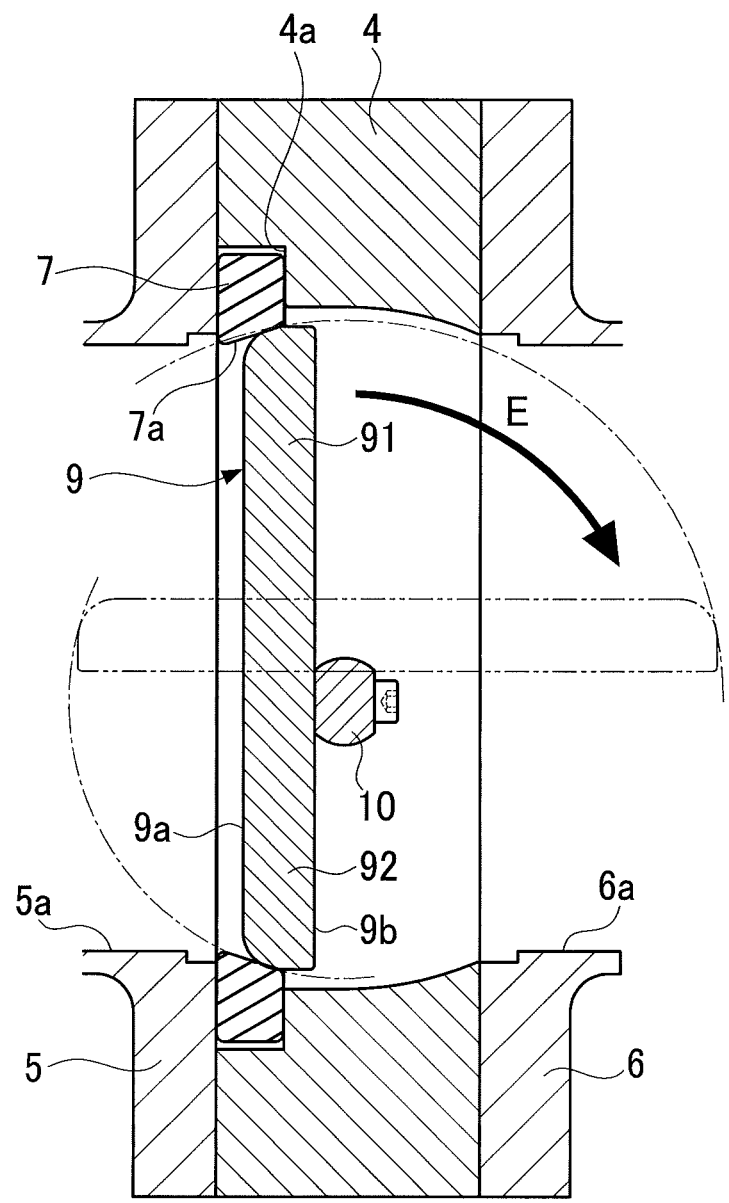
FIG. 19 is a sectional view of a vacuum pressure apparatus in another embodiment.

For instance, in the foregoing embodiments, the guide member 8 is fitted in the elastic seal member 7, and the axial distance Z1 of the thick part 73, the axial distance Z2 of the guide member 8, and the axial distance Z3 of the thick part 72 are equal to each other (Z1:Z2:Z3=1:1:1). However, the thickness of each of the thick parts 72 and 73 can be designed to any value as long as the sealing performance can be maintained. In some cases, as shown in FIG. 19, the guide member 8 may be absent. In this case, the sealing performance can be maintained by selecting the materials of the elastic seal member 7. That is because, for example, the reaction force can be large if an elastic seal member 7 made of high-hardness materials is selected. The materials of the elastic seal member 7 can be, for example, FKM, FFKM, or NBR.

REFERENCE SIGNS LIST

1 Vacuum pressure control apparatus
4 Body
5, 6 Connector
7 Elastic seal member
7a Valve seat
7b Annular groove
8 Guide member
9 Valve element
71 Thin part
72, 73 Thick part

What is claimed is:

1. A vacuum pressure control apparatus configured to be placed on a pipe connecting a vacuum chamber and a vacuum pump, the vacuum pressure control apparatus including:
    an annular elastic seal member formed with a valve seat;
    a doubly eccentric butterfly valve element configured to come into contact or separate from the valve seat and rotate in a first direction from a first valve closed position to change vacuum pressure in the vacuum chamber, the butterfly valve element including a first contact surface configured to contact the elastic seal member in a second valve closed position different from the first valve closed position, and a portion of the first contact surface configured to contact the elastic seal member only when the butterfly valve element is in the second valve closed position; and
    a control unit configured to rotate the butterfly valve element in a second direction opposite to the first direction so that the butterfly valve element is moved to the second valve closed position, wherein:
        in response to the elastic seal member changing in shape due to contact with the butterfly valve element over a time period after the butterfly valve element is initially disposed in the first valve closed position, the control unit is configured to rotate and move the butterfly valve element by a determined amount from the first valve closed position to the second valve closed position to provide a seal between the portion of the first contact surface of the butterfly valve element and the elastic seal member.

2. The vacuum pressure control apparatus according to claim 1, wherein the elastic seal member is provided with an annular groove to have a U-shaped cross section open on one side, and the vacuum pressure control apparatus further includes a guide member fitted in the annular groove so that the guide member annularly protrudes from the annular groove.

3. The vacuum pressure control apparatus according to claim 2, wherein the first contact surface includes a circumferential edge portion configured to come into contact with the valve seat, the circumferential edge portion being a curved surface.

4. The vacuum pressure control apparatus according to claim 2, wherein the butterfly valve element includes a second contact surface and the first contact surface opposite to the second contact surface, the first contact surface being configured to come into contact with the valve seat, and the second contact surface being formed with a recess.

5. The vacuum pressure control apparatus according to claim 2, further comprising:
    a body to which the butterfly valve is attached; and
    a connector connected to the body, wherein the elastic seal member is sandwiched between the body and the connector.

6. The vacuum pressure control apparatus according to claim 1, wherein the first contact surface includes a circumferential edge portion configured to come into contact with the valve seat, the circumferential edge portion being a curved surface.

7. The vacuum pressure control apparatus according to claim 6, wherein the butterfly valve element includes a second contact surface and the first contact surface opposite to the second contact surface, the first contact surface being configured to come into contact with the valve seat, and the second contact surface being formed with a recess.

8. The vacuum pressure control apparatus according to claim 6, further including:
    a body to which the butterfly valve is attached; and
    a connector connected to the body, wherein the elastic seal member is sandwiched between the body and the connector.

9. The vacuum pressure control apparatus according to claim 1, wherein the butterfly valve element includes a second contact surface and the first contact surface opposite to the second contact surface, the first contact surface being configured to come into contact with the valve seat, and the second contact surface being formed with a recess.

10. The vacuum pressure control apparatus according to claim 9, further including:
    a body to which the butterfly valve is attached; and
    a connector connected to the body, wherein the elastic seal member is sandwiched between the body and the connector.

11. The vacuum pressure control apparatus according to claim 1, further including:
    a body to which the butterfly valve is attached; and
    a connector connected to the body,
    wherein the elastic seal member is sandwiched between the body and the connector.

12. The vacuum pressure control apparatus according to claim 1, further including:
    a body to which the butterfly valve is attached, the body including a valve hole defined by an inner wall having an arched cross section and a recess formed radially outside of the valve hole so that the elastic seal member is mounted in the recess; and
    a connector connected to the body, the connector including a flange in contact with the body,
    wherein the elastic seal member is sandwiched between the flange and the recess.

13. A vacuum pressure control apparatus configured to be placed on a pipe connecting a vacuum chamber and a vacuum pump, the vacuum pressure control apparatus comprising:
- an annular elastic seal member formed with a valve seat;
- a butterfly valve element configured to come into contact or separate from the valve seat, the butterfly valve element configured to rotate in a first direction from a first valve closed position corresponding to an initial state to change vacuum pressure in the vacuum chamber, the butterfly valve element including:
  - a second surface and a first surface opposite to the second surface, the second surface being configured to come into contact with the valve seat;
  - a first valve element part having an arc more than half a circumference of the butterfly valve element with respect to a central axis of a rotating shaft; and
  - a second valve element part having a shorter arc of the circumference of the butterfly valve element than the first valve element part;
- the rotating shaft placed on the first surface to be doubly eccentric from a central point of the butterfly valve element, a recess being formed only between the rotating shaft on the first surface and the first valve element part; and
- a control unit configured to rotate the butterfly valve element in a direction opposite to the first direction so that the butterfly valve element is moved to a second valve closed position different from the first valve closed position.

* * * * *